(12) United States Patent
Said et al.

(10) Patent No.: US 8,294,409 B2
(45) Date of Patent: Oct. 23, 2012

(54) CONTROL OF POLE-CHANGE INDUCTION MOTORS

(75) Inventors: Waleed Said, Rockford, IL (US); Huazhen Chai, Caledonia, IL (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 136 days.

(21) Appl. No.: 12/858,764

(22) Filed: Aug. 18, 2010

(65) Prior Publication Data
US 2012/0043921 A1 Feb. 23, 2012

(51) Int. Cl.
*H02P 1/38* (2006.01)

(52) U.S. Cl. ........ 318/773; 318/727; 318/779; 318/799; 180/65.31; 123/566

(58) Field of Classification Search ............. 318/727, 318/779, 799, 812, 430, 543, 73, 773; 62/172, 62/402; 244/135 R, 53 R; 123/41.11, 41.56, 123/566, 41.46, 41.49; 200/19.22; 180/65.31
See application file for complete search history.

(56) References Cited

U.S. PATENT DOCUMENTS

| | | | |
|---|---|---|---|
| 4,064,420 A * | 12/1977 | Yuda et al. | 318/776 |
| 4,370,605 A * | 1/1983 | Breznican | 318/773 |
| 4,644,242 A | 2/1987 | Takata et al. | |
| 4,770,340 A | 9/1988 | Takata | |
| 4,784,580 A | 11/1988 | Takata et al. | |
| 4,967,096 A * | 10/1990 | Diemer et al. | 307/19 |
| 5,031,573 A | 7/1991 | De Marco et al. | |
| 5,704,218 A | 1/1998 | Christians et al. | |
| 5,880,571 A * | 3/1999 | Seffernick et al. | 318/773 |
| 6,008,616 A * | 12/1999 | Nagayama et al. | 318/773 |
| 6,456,033 B1 * | 9/2002 | Nishimura | 318/773 |
| 6,928,832 B2 | 8/2005 | Lents et al. | |
| 6,965,182 B2 | 11/2005 | Jeong et al. | |
| 7,207,521 B2 * | 4/2007 | Atkey et al. | 244/58 |
| 7,513,119 B2 * | 4/2009 | Zielinski et al. | 60/778 |
| 7,757,502 B2 | 7/2010 | Merritt et al. | |
| 8,104,556 B2 * | 1/2012 | Kojima | 180/65.31 |
| 2005/0151019 A1 * | 7/2005 | Stevens | 244/135 R |

* cited by examiner

*Primary Examiner* — Walter Benson
*Assistant Examiner* — Antony M Paul
(74) *Attorney, Agent, or Firm* — Cantor Colburn LLP (57) ABSTRACT

A ram air fan control system includes a ram air fan motor, the ram air fan motor being a pole-change induction motor with at least two pole-count configurations, a ram air fan contactor in operative communication with a first pole-count configuration of the ram air fan motor over a ram air fan conductor bus, a ram air fan power controller in operative communication with the ram air fan contactor, a common contactor in operative communication a second pole-count configuration of the ram air fan motor over a common conductor bus, the common conductor bus being separate and electrically isolated from the ram air fan conductor bus, and a common power controller in operative communication with the common contactor.

16 Claims, 8 Drawing Sheets

FIG. 8

CONTROL OF POLE-CHANGE INDUCTION MOTORS

FIELD OF INVENTION

The subject matter disclosed herein relates generally to the field of pole change induction motors, and more particularly to the use and control of pole change induction motors in ram air fan systems.

DESCRIPTION OF RELATED ART

Figure 1:
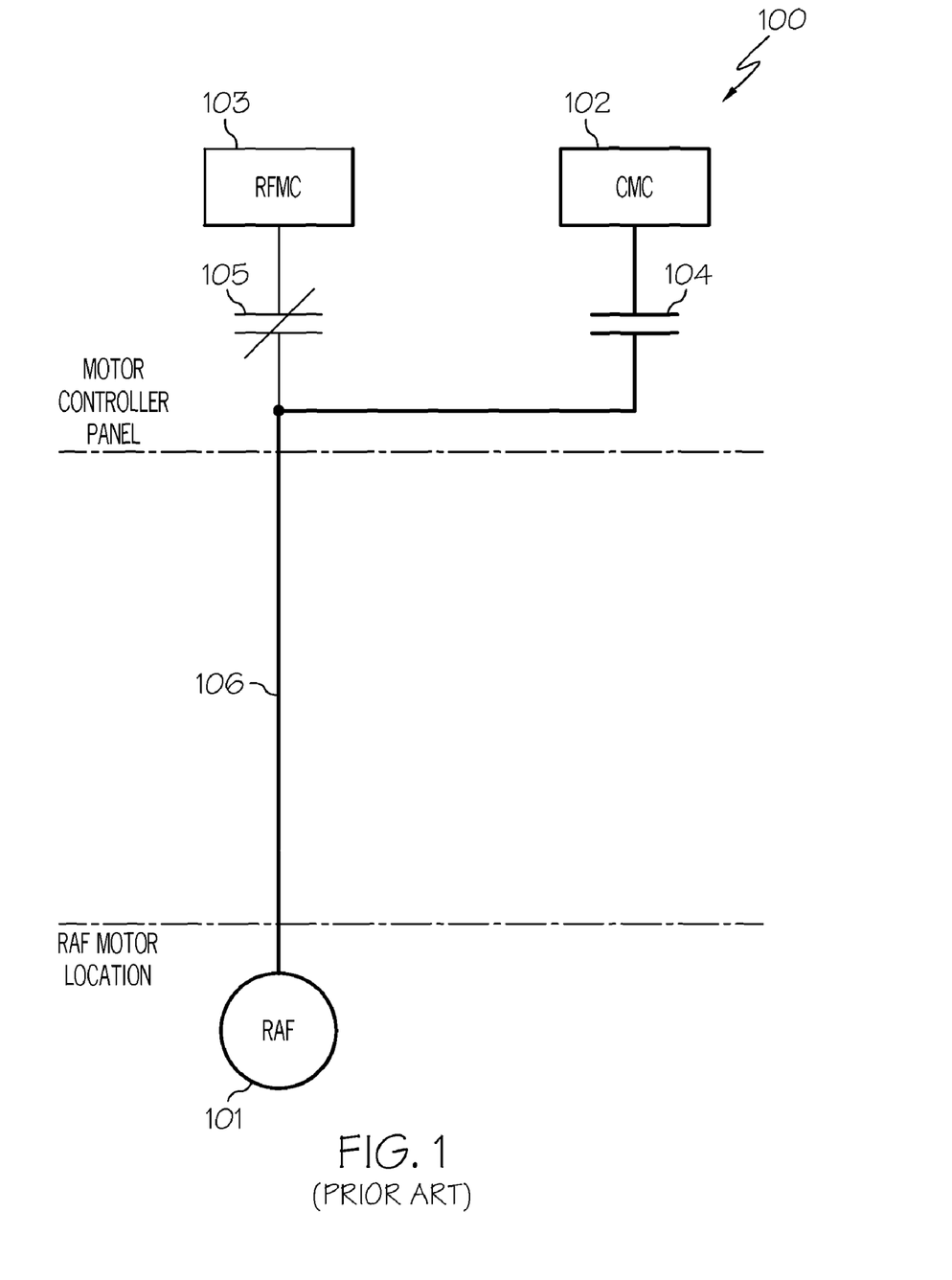
FIG. 1 depicts a conventional ram air fan control system.

Conventionally, an induction motor may be driven through a motor controller. As illustrated in FIG. 1, a ram air fan motor (RAF) 101 is normally driven by common motor controller 102 at high speed and high power. If the common motor controller 102 is not available, RAF motor controller 103 is used to power the RAF 101 at low speed and low power. The switch-over may be accomplished by controlling interlocked contactors (or relays/breakers) 104 and 105. Both contactors 104 and 105, as well as the motor controllers 102 and 103, are located in a motor controller panel or rack.

The RAF 101 is located remote from the motor controller panel where motor controllers 102-103 and the contactors 104-105 are located. Three phase power is fed to the RAF 101 through high current motor feeder/conductor bus 106.

Figure 2:
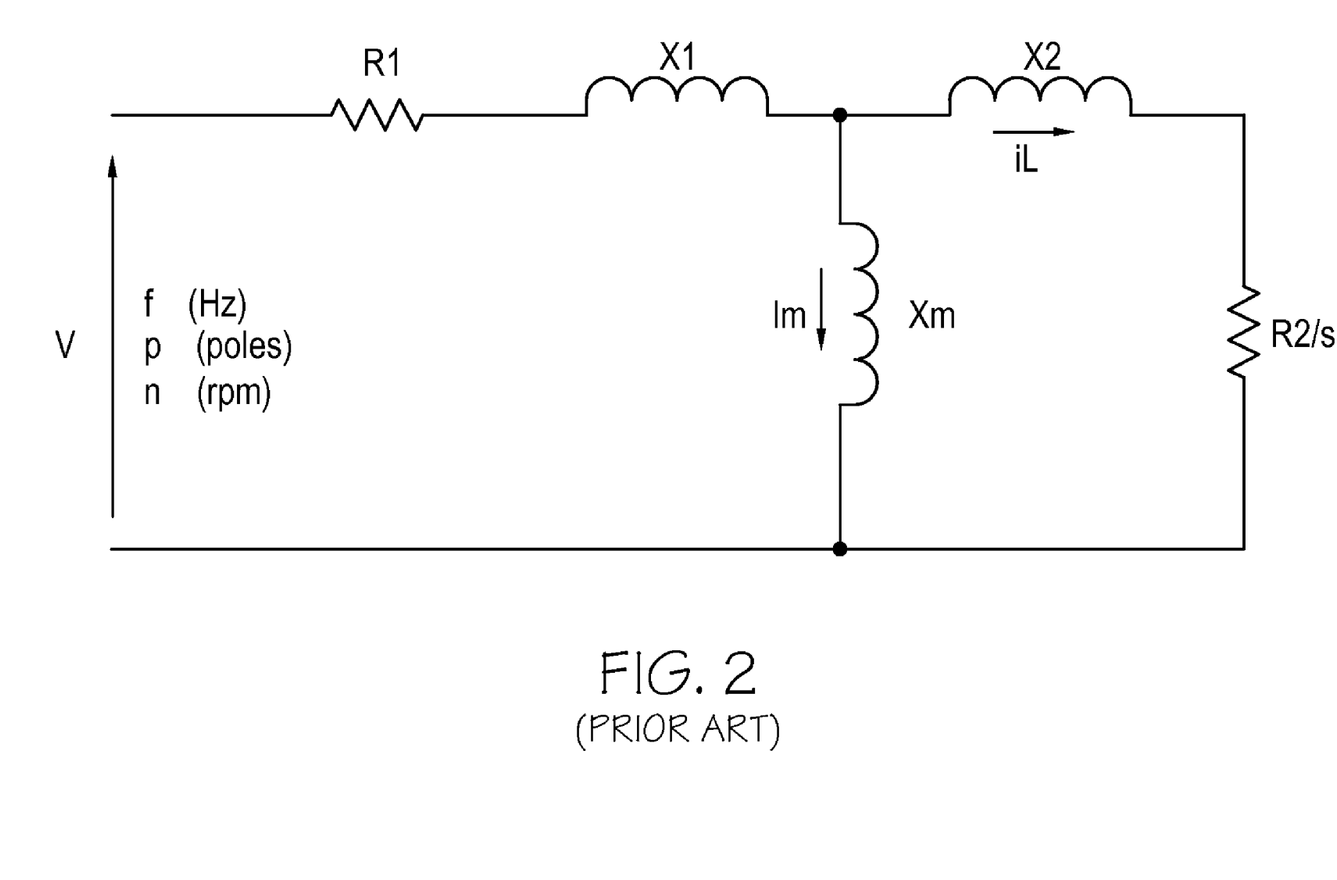
FIG. 2 depicts an equivalent circuit for a ram air fan motor.

The equivalent circuit of the RAF motor 101 when driven by CMC 102 is shown in FIG. 2. $I_L$ is the load current that produces the motor torque, while $I_m$ is the magnetizing current in the motor. This high-speed, high-power operating condition is the rated condition the motor is designed to operate, hence resulting in a higher power factor and efficiency.

However, if the RAF 101 is driven by controller 102 at about half the rated speed (see FIG. 3), the load torque, and hence the load current, is reduced to about ¼ of rated load current, while magnetizing current $I_m$ remains more or less the same as that in the motor's rated condition. Hence the magnetizing current becomes a very significant part of the overall current, and the power factor becomes very low.

Figure 3:
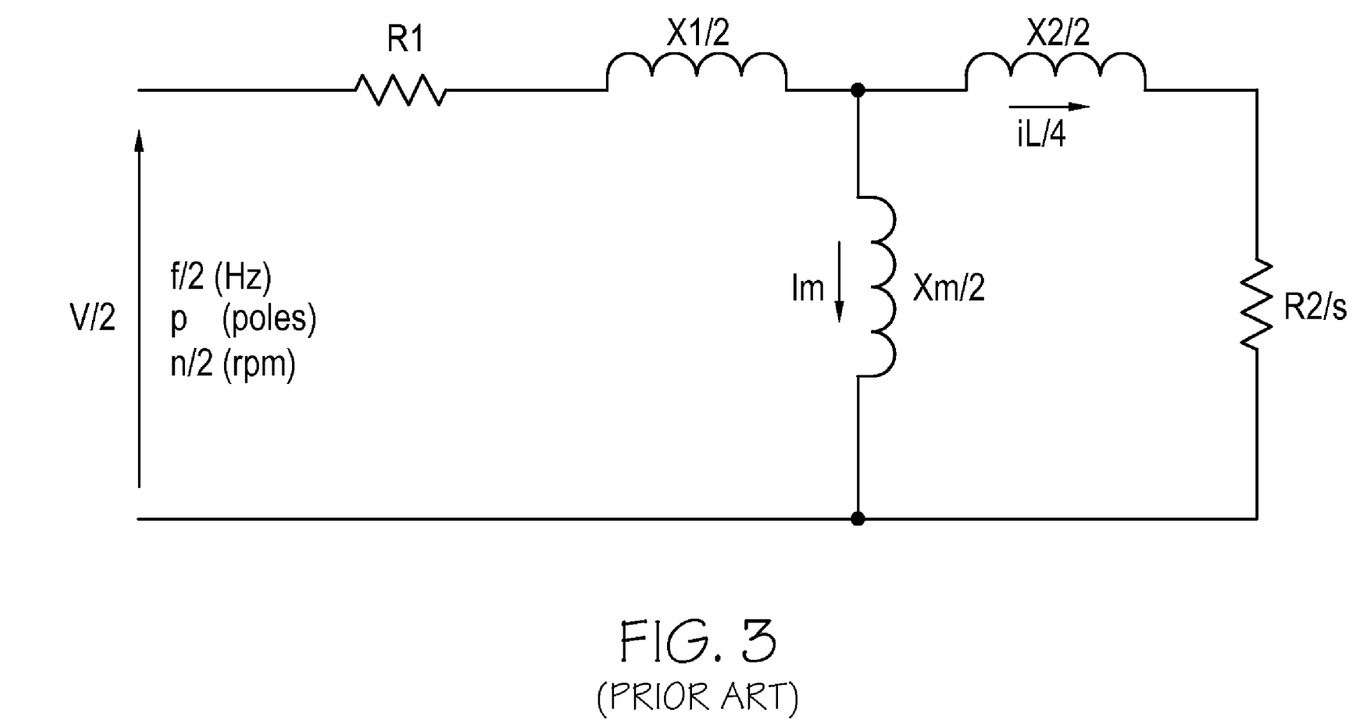
FIG. 3 depicts an equivalent circuit for a ram air fan motor.

In addition to the excessive magnetizing current relative to the low load current, the operation of RAF motor 101 at low speed and low terminal voltage with higher current further reduces the efficiency of the RAF motor 101 as well as the motor controller 103. The inefficient, low power factor and low terminal voltage operating condition of the RAF 101 results in the necessity of a relatively large rating and weight for contactor 105.

BRIEF SUMMARY

According to one aspect of the invention, a ram air fan control system includes a ram air fan motor, the ram air fan motor being a pole-change induction motor with at least two pole-count configurations, a ram air fan contactor in operative communication with a first pole-count configuration of the ram air fan motor over a ram air fan conductor bus, a ram air fan power controller in operative communication with the ram air fan contactor, a common contactor in operative communication a second pole-count configuration of the ram air fan motor over a common conductor bus, the common conductor bus being separate and electrically isolated from the ram air fan conductor bus, and a common power controller in operative communication with the common contactor.

According to another aspect of the invention, a ram air fan control system includes a ram air fan motor, the ram air fan motor being a pole-change induction motor with at least two pole-count configurations, a first ram air fan contactor in operative communication with a first pole-count configuration of the ram air fan motor, a conductor bus in operative communication with the first ram air fan contactor, a second ram air fan contactor in operative communication with the first ram air fan contactor over the conductor bus, a ram air fan power controller in operative communication with the second ram air fan contactor, a first common contactor in operative communication a second pole-count configuration of the ram air fan motor, a second common contactor in operative communication with the first common contactor over the conductor bus, and a common power controller in operative communication with the common contactor.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Example embodiments of the present invention provide ram air fan control systems of reduced weight and increased efficiency compared to conventional systems. Example embodiments may include novel pole-change motor configurations to facilitate both high and low-speed operation of pole-change motors within an aircraft while maintaining similar operating frequencies and voltages at separate power controllers.

Figure 4A:
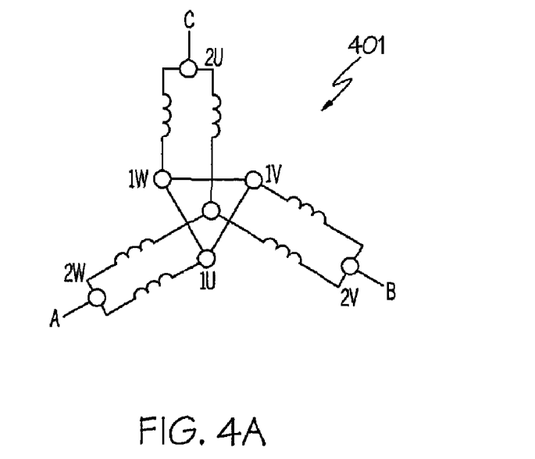
FIGS. 4A-4D depict motor winding and terminal connections for a pole-change motor, according to an example embodiment.
Figure 4B:
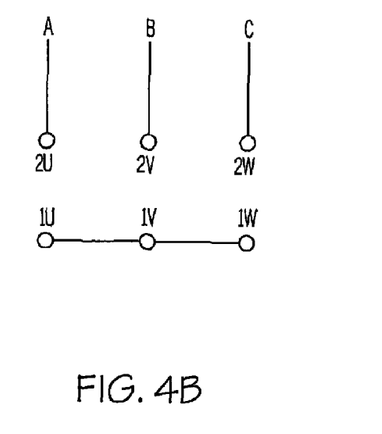
Figure 4C:
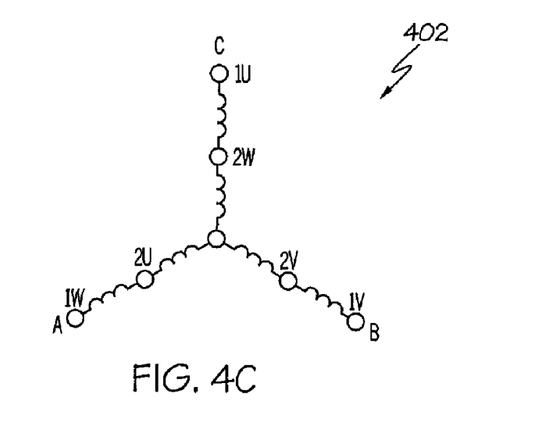
Figure 4D:
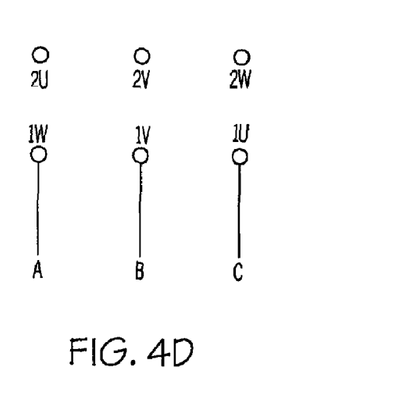

Turning to FIGS. 4A-4D, a motor winding and terminal connection diagram for a YY/Y configured pole change motor 401 are illustrated. As shown in FIGS. 4A and 4D, the pole change motor 401 includes midpoint taps at each phase winding.

Turning to FIGS. 4A-4B, high-speed motor winding and terminal connections are illustrated. As shown, terminal connections 2U, 2V, and 2W are connected to three phase power denoted by phases A, B, and C, thereby allowing power to be applied at associated poles. Further, terminal connections 1U, 1V, and 1W are also connected to phases A, B, and C, thereby allowing power to be applied at associated poles. In this configuration, the windings are connected as two Y's in parallel such that there is a maximum number of poles made available, thereby allowing high-speed operation of the motor 401.

Turning to FIGS. 4C and 4D, low-speed motor winding and terminal connections are illustrated. As shown, terminal connections 1U, 1V, and 1W are connected to three phase power denoted by phases A, B, and C, thereby allowing power to be applied at associated poles. Further, terminal connections 2U, 2V, and 2W are not connected to phases A, B, and C. In this configuration, the windings are connected as a single Y such that there is a minimal number of poles made available, thereby allowing low-speed operation of the motor 401.

Example embodiments should not be limited to only YY/Y configured pole change motors, however.

Figure 5A:
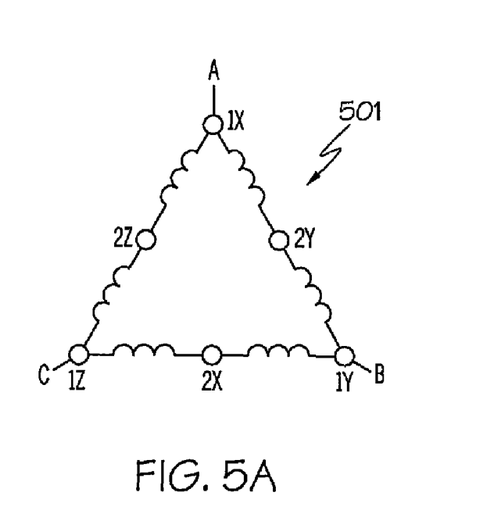
FIGS. 5A-5D depict motor winding and terminal connections for a pole change motor, according to an example embodiment.
Figure 5B:
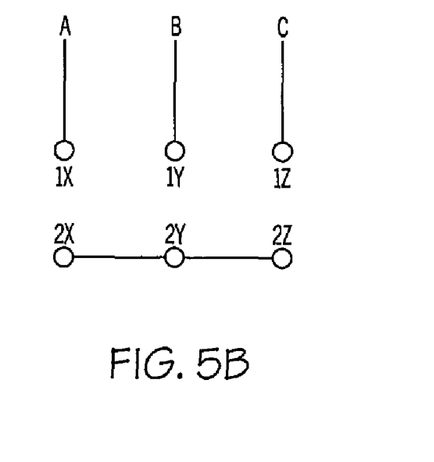
Figure 5C:
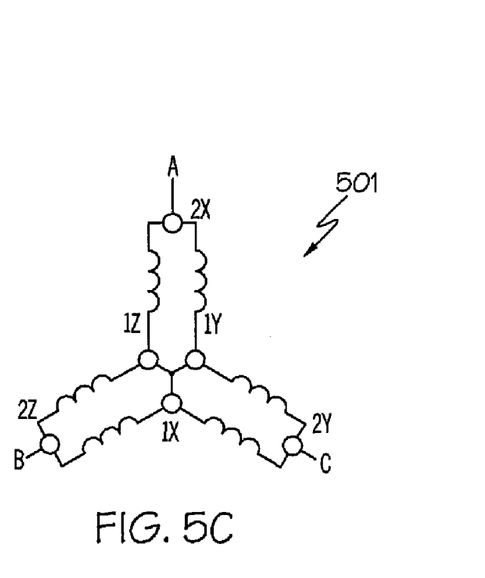
Figure 5D:
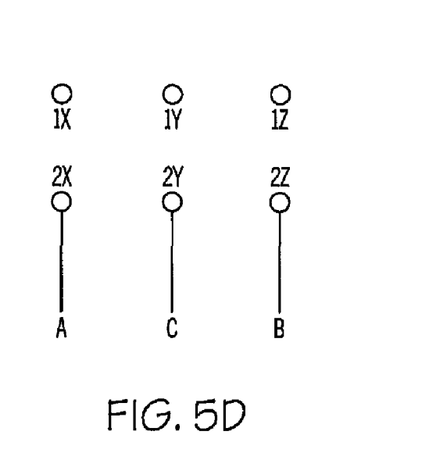

Turning to FIGS. 5A-5D, a motor winding and terminal connection diagram for a YY/Δ configured pole change motor 501 are illustrated. As shown in FIGS. 5A and 5D, the pole change motor 501 includes midpoint taps at each phase winding.

Turning to FIGS. 5A-5B, low-speed motor winding and terminal connections are illustrated. As shown, terminal connections 2X, 2Y, and 2Z are not connected to three phase power denoted by phases A, B, and C. Further, terminal connections 1X, 1Y, and 1Z are connected to phases A, B, and C, thereby allowing power to be applied at associated poles. In this configuration, there is a minimal number of poles made available, thereby allowing low-speed operation of the motor 501.

Turning to FIGS. 5C and 5D, high-speed motor winding and terminal connections are illustrated. As shown, terminal connections 2X, 2Y, and 2Z are connected to three phase power denoted by phases A, B, and C, thereby allowing power to be applied at associated poles. Further, terminal connections 1X, 1Y, and 1Z are also connected to phases A, B, and C, thereby allowing power to be applied at associated poles. In this configuration, there is a maximum number of poles made available, thereby allowing high-speed operation of the motor 501.

Figure 6:
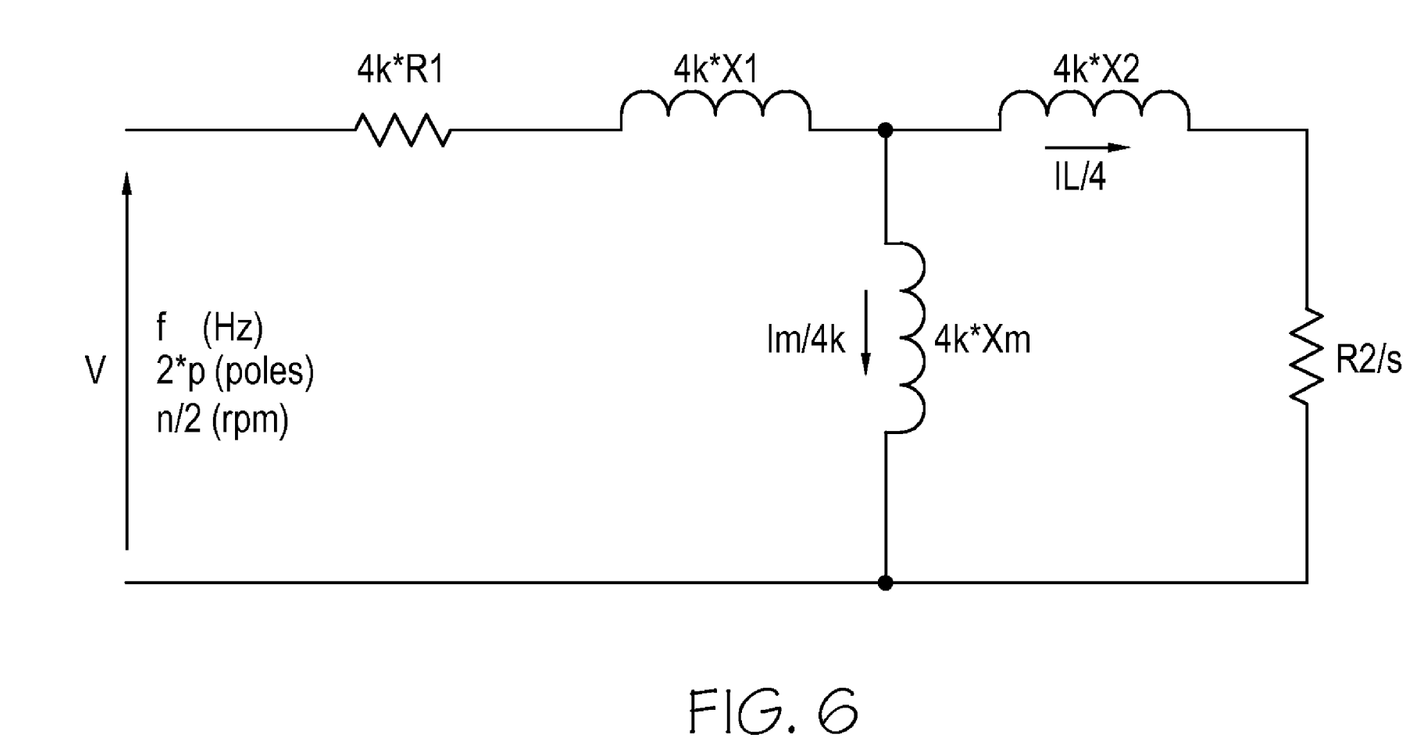
FIG. 6 depicts an equivalent circuit for a pole-change motor.

Turning to FIG. 6, an equivalent circuit for a YY/Y configured pole change motor, driven at low speed (see FIGS. 4C-4D), is illustrated. Although the example of FIG. 6 is described with reference to a YY/Y pole change motor and associated connections only, it should be understood that any other suitable pole-change configuration is also applicable.

According to FIG. 6, the ratio between magnetizing current and load current of the motor 401 is now the same as that of a low-speed rated condition, and the same full motor terminal voltage as would be applied in a high-speed condition is applied such that the current is significantly reduced. The net result is a relatively smaller and lighter motor controller and contactor are needed to drive the motor 401 when compared to MC 103 and contactor 105 of FIG. 1.

For clarity of comparison, the parameters in the equivalent circuit depicted in FIG. 6 include a winding factor which is unchanged for the two configurations of low-speed and high-speed. The winding factor includes pole pitch effects and winding distribution effects along armature slots of the motor 401. Depending upon a design of the motor 401, under the two pole count conditions of FIGS. 4A and 4C, pitch of the windings cannot be optimized for both pole counts due to the winding distribution factor being different for different pole counts. For example, one possible motor design may have a half pitch, 60-degree winding distribution for a low pole count, and have a full pitch, 120-degree winding distribution for a high pole count. Thus, the ratio of winding factors for different pole counts would be given by Equation 1:

$$k = \frac{k_1}{k_2} = \frac{k_{y1}k_{q1}}{k_{y1}k_{q1}} = \frac{0.707*0.958}{1.0*0.836} = 0.81 \qquad \text{Equation 1}$$

The ratio of flux density after and before pole change is normally given by Equation 2:

$$\frac{B_2}{B_1} = \frac{k_1 w_1 E_2 p_2 f_1}{k_2 w_2 E_1 p_1 f_2} \qquad \text{Equation 2}$$

For the YY/Y type pole change motor 401, the windings are connected as two "Y's" in parallel for high-speed operation, and connected as a single "Y" for low-speed operation. Thus, the ratio of flux density after and before pole change for motor 401 is given by Equation 3:

$$\frac{B_2}{B_1} = \frac{k_1 w_1 E_2 p_2 f_1}{k_2 w_2 E_1 p_1 f_2} \approx \frac{k_1}{k_2} = k \qquad \text{Equation 3}$$

Hence the ratio of maximum available torque and maximum available power are given by Equations 4 and 5:

$$\frac{T_2}{T_1} \approx \frac{B_2}{B_1} \approx k \qquad \text{Equation 4}$$

$$\frac{P_2}{P_1} \approx \frac{B_2}{B_1} * \frac{p_1}{p_2} \approx \frac{1}{2} * k \qquad \text{Equation 5}$$

The maximum available torque and power are above what may be required for a fan-type of load, or for example, a ram air fan load.

The pole change control of induction motors according to example embodiments of the present invention may also be implemented with a YY/Δ type of motor connected as shown in FIGS. 5A-5D.

As described above, example embodiments provide pole change motor systems which may be of reduced weight as compared to conventional induction motor systems arising from smaller motor controllers and contactors being necessary to provide control and power to induction motors. Hereinafter, example systems are described with reference to FIGS. 7-8.

Figure 7:
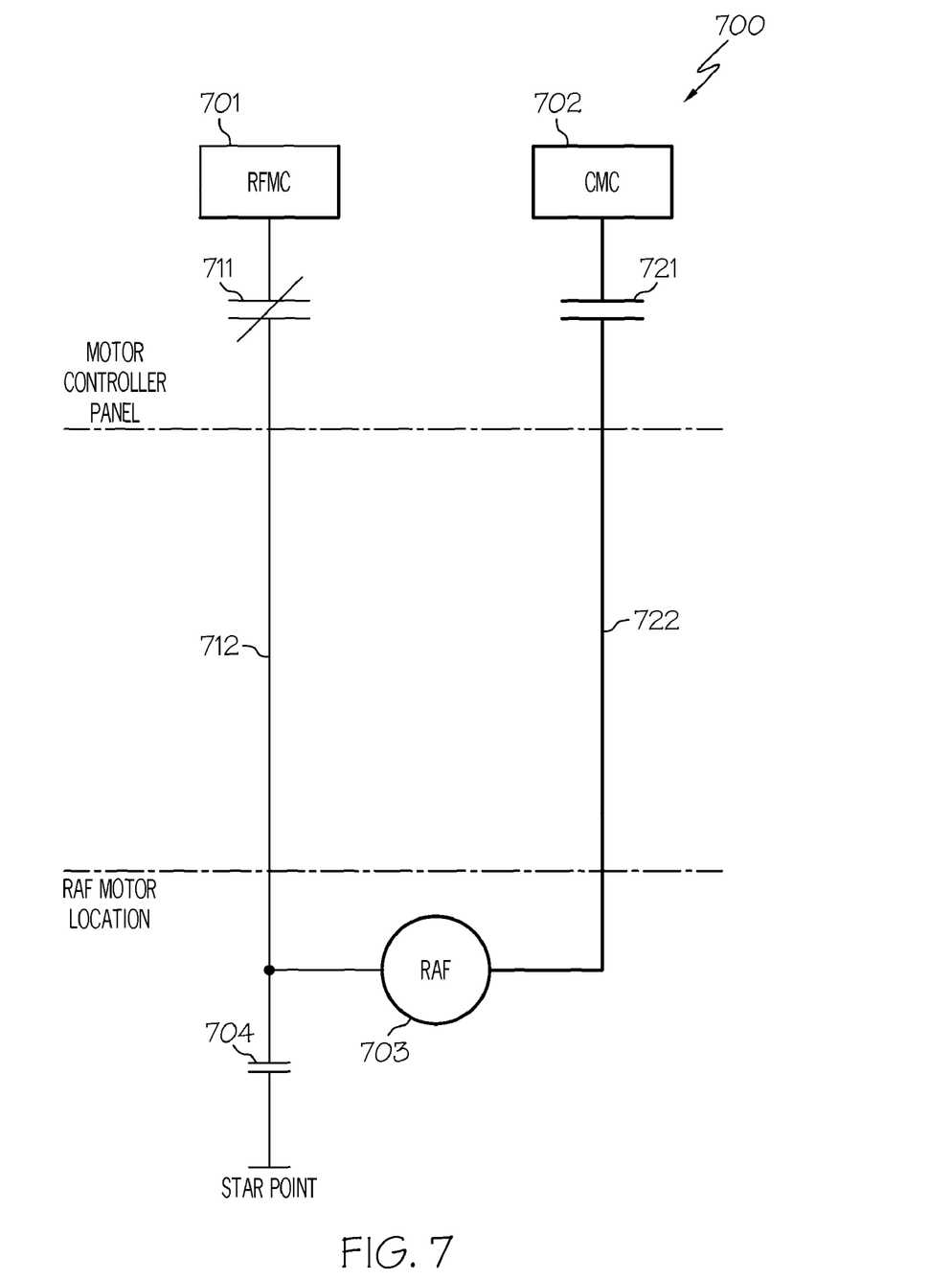
FIG. 7 depicts a ram air fan control system, according to an example embodiment.

FIG. 7 is a ram air fan motor control system, according to an example embodiment. As illustrated, the system 700 includes a ram air fan motor controller (RFMC) 701. The RFMC 701 may be a relatively small power controller configured to address low-power applications for a ram air fan. For example, the RFMC 701 may be configured to provide power to ram air fan motors during scenarios where the ram air fans should be driven at low-speed, or situations where other power controllers are providing power to more essential aircraft systems.

The system 700 further includes ram air fan contactor 711 operatively connected to RFMC 701. The contactor 711 may be closed in response to a condition where a ram air fan should be driven at low-speed, as described above.

The system 700 may further include conductor bus 712 operatively connected to the contactor 711. The conductor bus 712 may be a conductor bus with conductors sized to adequately provide power to a ram air fan motor operating in a low-speed configuration.

The system 700 may further include ram air fan (RAF) 703 operatively connected to the contactor 711 over the conductor bus 712. The RAF 703 may include any pole change induction motor configured to drive a ram air fan. Further, the pole change motor may be in any configuration, including a YY/Y and YY/Δ configuration.

The system 700 further includes contactor 704 operatively connected to RAF 703. The contactor 704 may be configured to open in response to a condition where the RAF 703 should be disconnected/powered down completely.

The system 700 further includes common power controller (CMC) 702. The CMC 702 may be a relatively large power controller configured to address power applications for a large portion or entirety of an aircraft. For example, the CMC 702 may be configured to provide power to essential and non-essential aircraft systems.

The system 700 further includes ram air fan contactor 721 operatively connected to CMC 702. The contactor 721 may be closed in response to a condition where a ram air fan should be driven at high-speed, as described above.

The system 700 may further include conductor bus 722 operatively connected to the contactor 721. The conductor bus 722 may be a conductor bus with conductors sized to adequately provide power to a ram air fan motor operating in a high-speed configuration. The conductor bus 722 is separate and electrically isolated from the conductor bus 712. As illustrated, the RAF 703 is operatively connected to the contactor 721 over the conductor bus 722.

The system 700 may be applicable to aircraft where an additional conductor bus for low-speed operation of a ram air fan is desirable, and would necessitate a relatively small number of contactors. Hereinafter, an alternative system is described with reference to FIG. 8.

Figure 8:
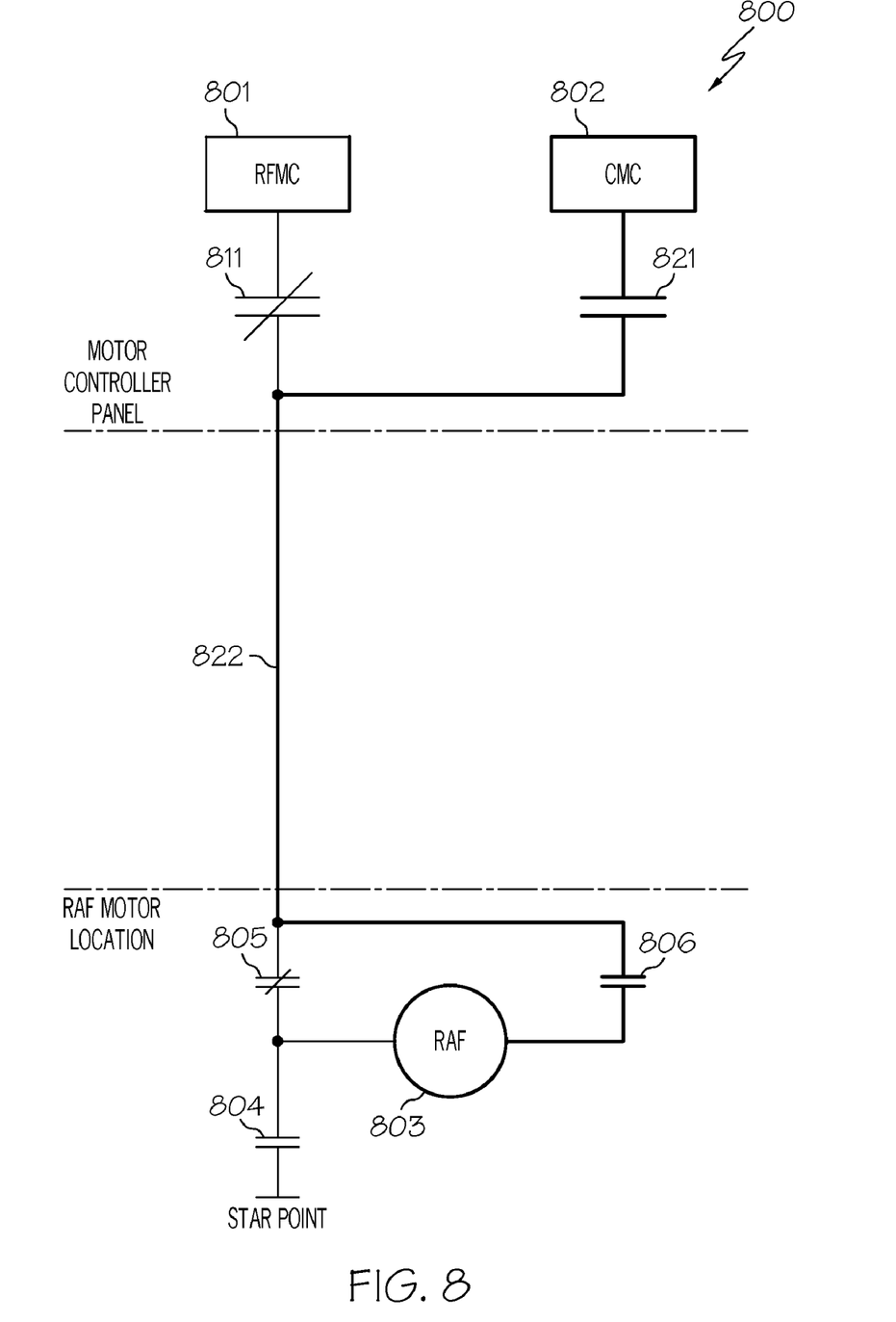
FIG. 8 depicts a ram air fan control system, according to an example embodiment.

FIG. 8 is a ram air fan motor control system, according to an example embodiment. As illustrated, the system 800 includes a ram air fan motor controller (RFMC) 801. The RFMC 801 may be a relatively small power controller configured to address low-power applications for a ram air fan. For example, the RFMC 801 may be configured to provide power to ram air fan motors during scenarios where the ram air fans should be driven at low-speed, or situations where other power controllers are providing power to more essential aircraft systems.

The system 800 further includes ram air fan contactor 811 operatively connected to RFMC 801. The contactor 811 may be closed in response to a condition where a ram air fan should be driven at low-speed, as described above.

The system 800 may further include conductor bus 822 operatively connected to the contactor 811. The conductor bus 822 may be a conductor bus with conductors sized to adequately provide power to a ram air fan motor operating in both a high-speed configuration and a low-speed configuration. Thus, in contrast to the system 700, the system 800 necessitates a single conductor bus to power a ram air fan in both desired configurations.

The system 800 further includes contactor 805 operatively connected to the contactor 811 over the conductor bus 822. The contactor 805 may be configured to close in response to a condition where a ram air fan should be driven at low-speed, as described above.

The system 800 may further include ram air fan (RAF) 803 operatively connected to the contactor 805. The RAF 803 may include any pole change induction motor configured to drive a ram air fan. Further, the pole change motor may be in any configuration, including a YY/Y and YY/Δ configuration.

The system 800 further includes contactor 804 operatively connected to RAF 803. The contactor 804 may be configured to open in response to a condition where the RAF 803 should be disconnected/powered down completely.

The system 800 further includes common power controller (CMC) 802. The CMC 802 may be a relatively large power controller configured to address power applications for a large portion or entirety of an aircraft. For example, the CMC 802 may be configured to provide power to essential and non-essential aircraft systems.

The system 800 further includes ram air fan contactor 821 operatively connected to CMC 802. The contactor 821 may be closed in response to a condition where a ram air fan should be driven at high-speed, as described above.

The system 800 further includes contactor 806 operatively connected to the contactor 821 over conductor bus 822. The contactor 806 may be closed in response to a condition where a ram air fan should be driven at high-speed, as described above.

As illustrated, the RAF 803 is operatively connected to the contactor 806 and subsequently to the contactor 821 over the conductor bus 822. Therefore, if contactors 821 and 806 are both closed, the RAF 803 may operate in a high-speed configuration. Alternatively, if both the contactors 811 and 805 are closed, the RAF 803 may operate in a low-speed configuration. However, in contrast to the system 700, both configurations may be available over a common conductor bus 822.

Thus, the system 800 may be applicable to aircraft where a single conductor bus for both low-speed and high-speed operation of a ram air fan is desirable, and would necessitate a plurality of contactors 805-806 to facilitate pole changing of the RAF 803.

The technical effects and benefits of example embodiments include relatively reduced weight of ram air fan control systems on an aircraft. Through changing poles on a ram air fan motor to facilitate a low-speed operating condition with lower current than conventional systems, smaller contactors are necessary to facilitate both high and low-speed operation, resulting in lower overall weight of the ram air fan control system. Furthermore, through the use of a pole change motor for a ram air fan, both a common motor controller and a ram air fan motor controller operate at substantially the same output voltage and frequency.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:
1. A ram air fan control system, comprising:
a ram air fan motor for use in driving a ram air fan in an aircraft, the ram air fan motor being a pole-change induction motor with at least two pole-count configurations;
a ram air fan motor contactor in operative communication with a first pole-count configuration of the ram air fan motor over a ram air fan motor conductor bus;
a ram air fan motor power controller in operative communication with the ram air fan motor contactor;
a common contactor in operative communication a second pole-count configuration of the ram air fan motor over a common conductor bus, the common conductor bus being separate and electrically isolated from the ram air fan motor conductor bus; and a common power controller in operative communication with the common contactor;

wherein the ram air fan motor contactor electrically couples the first pole-count configuration of the ram air fan motor to the ram air fan motor power controller when the ram air fan motor is operating at low speed and wherein the common contactor electrically couples the second pole-count configuration of the ram air fan motor to the common power controller when the ram air fan motor is operating at high speed.

2. The system of claim 1, wherein the ram air fan motor is a YY/Y pole-change motor.

3. The system of claim 2, wherein the first pole-count configuration is a configuration where windings of the ram air fan motor are connected as a single Y.

4. The system of claim 2, wherein the second pole-count configuration is a configuration where windings of the ram air fan motor are connected as two Y's in parallel.

5. The system of claim 1, wherein the first pole-count configuration is a low-speed configuration with less poles than the second pole-count configuration.

6. The system of claim 1, wherein the second pole-count configuration is a high-speed configuration with more poles than the first pole-count configuration.

7. The system of claim 1, wherein the ram air fan contactor is of a lower current rating than the common contactor, and the ram air fan conductor bus is of a lower current rating than the common conductor bus.

8. The system of claim 1, wherein the ram air fan motor is a pole-change motor with midpoint tapped windings.

9. A ram air fan control system, comprising:
   a ram air fan motor, the ram air fan motor being a pole-change induction motor with at least two pole-count configurations;
   a first ram air fan motor contactor in operative communication with a first pole-count configuration of the ram air fan motor;
   a conductor bus in operative communication with the first ram air fan motor contactor;
   a second ram air fan motor contactor in operative communication with the first ram air fan contactor over the conductor bus;
   a ram air fan power motor controller in operative communication with the second ram air motor fan contactor;
   a first common contactor in operative communication a second pole-count configuration of the ram air fan motor;
   a second common contactor in operative communication with the first common contactor over the conductor bus; and
   a common power controller in operative communication with the common contactor,
   wherein the first ram air fan motor contactor electrically couples the first pole-count configuration of the ram air fan motor to the ram air fan motor power controller when the ram air fan motor is operating at low speed and wherein the first common contactor electrically couples the second pole-count configuration of the ram air fan motor to the common power controller when the ram air fan motor is operating at high speed.

10. The system of claim 9, wherein the ram air fan motor is a YY/Y pole-change motor.

11. The system of claim 10, wherein the first pole-count configuration is a configuration where windings of the ram air fan motor are connected as a single Y.

12. The system of claim 10, wherein the second pole-count configuration is a configuration where windings of the ram air fan motor are connected as two Y's in parallel.

13. The system of claim 9, wherein the first pole-count configuration is a low-speed configuration with less poles than the second pole-count configuration.

14. The system of claim 9, wherein the second pole-count configuration is a high-speed configuration with more poles than the first pole-count configuration.

15. The system of claim 9, wherein the ram air fan contactor is of a lower current rating than the common contactor, and the conductor bus is of a current rating at least as high as the common contactor.

16. The system of claim 9, wherein the ram air fan motor is a pole-change motor with midpoint tapped windings.

* * * * *